United States Patent [19]

Schütz

[11] Patent Number: 4,603,868

[45] Date of Patent: Aug. 5, 1986

[54] ROLLER SKATE UNDERCARRIAGE WITH ADJUSTABLE ROLLERS

[76] Inventor: Ernst Schütz, Adlikerstrasse 79, CH-8105 Regensdorf, Switzerland

[21] Appl. No.: 524,244

[22] Filed: Aug. 18, 1983

[30] Foreign Application Priority Data

Apr. 25, 1983 [CH] Switzerland .......................... 2210/83

[51] Int. Cl.[4] ............................................. A63C 17/18
[52] U.S. Cl. ................................. 280/7.13; 280/11.22; 280/11.27; 280/43; 301/1; 301/127
[58] Field of Search ................. 280/11.22, 11.23, 11.3, 280/11.27, 11.19, 7.13, 10, 11.1 BT, 80 B, 43; 301/1 X, 105 R, 127 X

[56] References Cited

U.S. PATENT DOCUMENTS

| | | | |
|---|---|---|---|
| 108,184 | 10/1870 | Pollitt | 280/11.27 |
| 346,664 | 8/1886 | Libbey | 280/11.27 |
| 2,145,219 | 1/1939 | Burton | 280/11.22 |
| 2,529,314 | 11/1950 | Schmid | 280/11.23 |
| 3,287,023 | 11/1966 | Ware | 280/11.22 |
| 3,355,185 | 11/1967 | Carter | 280/11.23 |
| 3,722,900 | 3/1973 | Dickert | 280/7.13 |
| 3,936,061 | 2/1976 | Wada | 280/11.23 |
| 4,076,263 | 2/1978 | Rand | 280/11.1 BR |
| 4,153,263 | 5/1979 | Yoshimoto | 280/11.1 BR |
| 4,294,456 | 10/1981 | Tuell | 280/11.28 |
| 4,324,408 | 4/1982 | Bensette | 280/7.13 |

FOREIGN PATENT DOCUMENTS

| | | |
|---|---|---|
| 351430 | 7/1979 | Australia . |
| 351986 | 8/1979 | Australia . |
| 7605025 | 2/1976 | Fed. Rep. of Germany . |
| 2736855 | 3/1979 | Fed. Rep. of Germany . |
| 172105 | 9/1934 | France ............................. 280/11.22 |
| 602148 | 7/1978 | Switzerland . |

OTHER PUBLICATIONS

"Rolling-Boots", Prospectus of Anker-Werk, Graz.

Primary Examiner—John J. Love
Assistant Examiner—Joseph G. McCarthy
Attorney, Agent, or Firm—Ostrolenk, Faber, Gerb & Soffen

[57] ABSTRACT

A roller skate undercarriage including a roller carrier having three or more pairs of rollers attached by screws to the upper structure of a roller skate or to the blade of an ice skate. The carrier has holes, one group of holes at the front, one group of holes at the rear and one hole between the front and rear groups to hold roller hubs. The center axes of the holes in the carrier and of the axle pins inserted through them are staggered with respect to the central axes of the roller hubs mounted on the axle pins so that the height of the rollers may be changed with respect to the roller carrier by turning the roller hubs. In this way the roller skate can be individually adapted to the user and the purpose of use.

6 Claims, 4 Drawing Figures

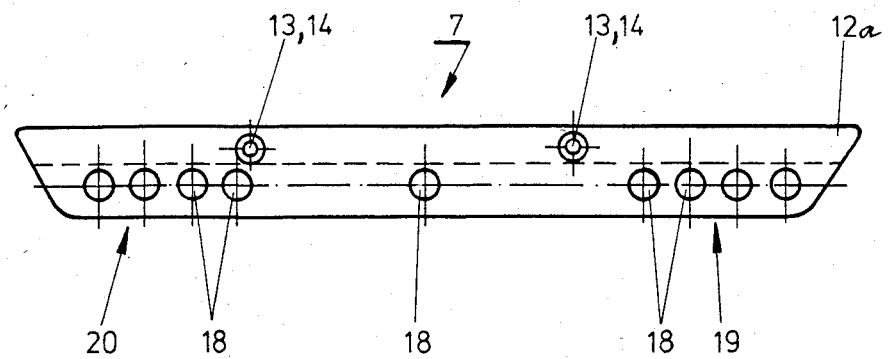
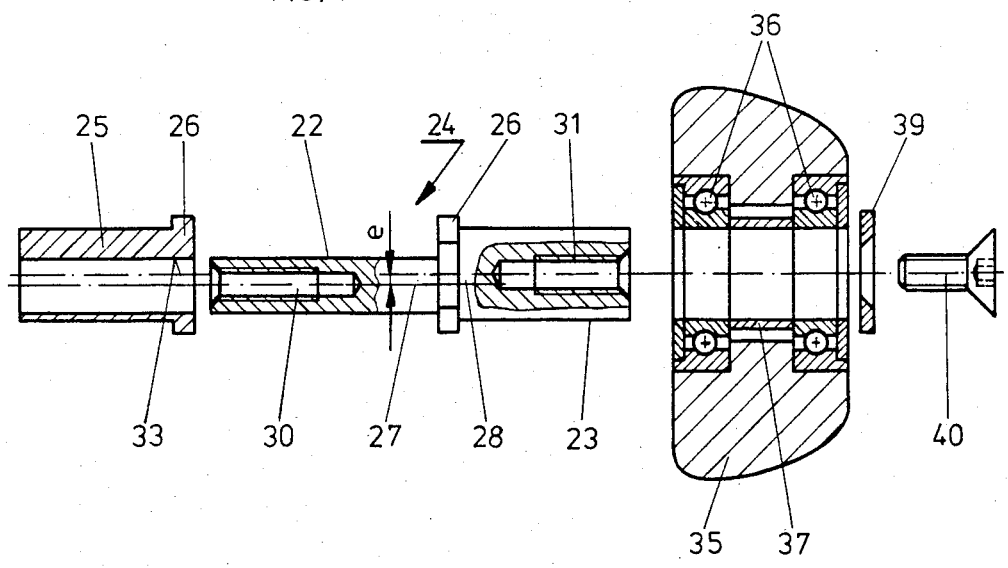

ROLLER SKATE UNDERCARRIAGE WITH ADJUSTABLE ROLLERS

BACKGROUND OF THE INVENTION

1. Field of the Invention

The present invention relates to a roller skate undercarriage which can be attached to a roller skate or an ice skate provided with an upper structure.

2. Description of the Prior Art

Roller skates have existed for more than a hundred years, as shown by U.S. Pat. No. 108,184, issued in 1870. They have been frequently improved, or at least redesigned, with their undercarriages being provided with a single, double or triple roller. Instead of a front and a rear cylindrical or barrel-shaped roller, U.S. Pat. No. 4,078,263 teaches a roller skate using a front and rear ball.

A good description of the prior art appears in the book *Roller Skate* by Alain-Yves Beaujour, published in German by Benteli-Verlag of Bern. Various roller skate constructions are described in it, and in particular roller-ice skates having as many as 5 rollers arranged one behind the other are described on pages 80 and 81.

That book also notes, however, that a roller skate is most useful only if it can be adapted individually to the user, to the purpose of use and to the available ice skates.

SUMMARY OF THE INVENTION

A primary object of the invention is to provide a roller skate which is adjustable so that it can be adapted individually to the user and to the purpose of use, as well as to any suitably constructed ice skate.

More specifically, an object of the invention is to provide a roller skate undercarriage in which the number, spacing and heights of the rollers are adjustable and in which the attachment to an ice skate blade is simple.

These and other objects of the invention are achieved by providing a roller carrier adapted for attachment to the upper or boot portion of a skate or to the blade of an ice skate, which is secured to the boot. The roller carrier of the preferred embodiment has a groove into which the blade of an ice skate fits. In each side of the groove, holes are located opposite each other so that screws may be used to hold the roller carrier firmly on the blade.

For supporting roller skating rollers, the carrier has transversely extending axle holes in which roller assemblies are mounted. In the preferred embodiment of the invention, there are at least three roller assemblies, arranged in one group of axle holes at the front of the roller carrier, another group of holes at the rear and a third group, which may be comprised of only one hole, midway between the front and rear groups. Thus, the front and rear roller assemblies may be mounted in any of the axle holes in the front and rear groups, respectively, while the center roller assembly may remain centered in relation to the roller carrier and the upper structure to which it is attached.

In the preferred embodiment, each roller assembly includes an axle which fits into the respective axle hole and which is integrally connected to a first hub which holds a first roller at one side of the roller carrier. A second hub fits over the axle on the other side of the roller carrier and holds the second roller. The hub axis around which each of the rollers rotates is eccentric with respect to the axis around which the axle rotates by the same distance, so that the heights of the rollers may be adjusted by turning the hubs of their axles. In the preferred embodiment, the first roller of a roller pair is held onto the first hub by a screw, and the second hub and the second roller are held onto the axle by another screw. The rollers contain bearings which turn on the respective hubs.

These and other objects, features and advantages of the invention will become more apparent from the accompanying drawings and the detailed description which follows.

BRIEF DESCRIPTION OF THE DRAWINGS

FIG. 3 is a side view of the roller-skate roller carrier of FIG. 1 without rollers.

FIG. 4 is an exploded view of the axle pin, hub, rollers and fastening elements of the invention, partially in section.

DETAILED DESCRIPTION OF THE PREFERRED EMBODIMENT

Figure 1:
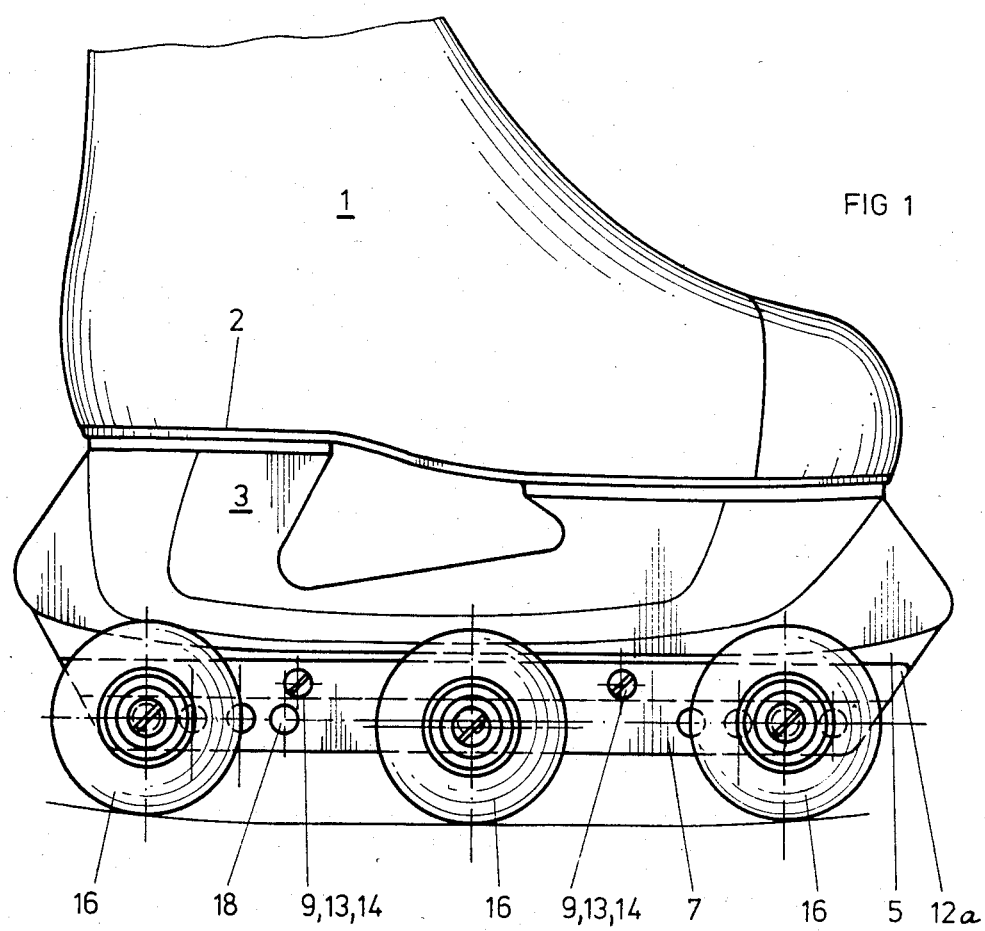
FIG. 1 is a side view of an ice skate with the inventive roller-skate undercarrage removably attached to its blade.

FIG. 1 shows an ice-skate boot 1 having a sole 2 to which an ice-skate upper structure 3 is fastened by rivets (not shown). Within the ice-skate upper structure 3 a blade 5 of an ordinary ice skate is held fast. This serves to hold a roller-skate roller carrier 7 in a manner which will be explained below. It is also possible to provide the ice-skate boot 1 as a roller-skate boot, with a similar roller-skate upper structure formed, for instance, of injection molded plastic and to fasten a roller-skate roller carrier 7 directly thereto. The result would be a pure roller skate. However, the embodiment shown in FIG. 1 makes it possible to use ice skates as roller skates by applying a roller-skate roller carrier to each ice skate blade.

Figure 2:
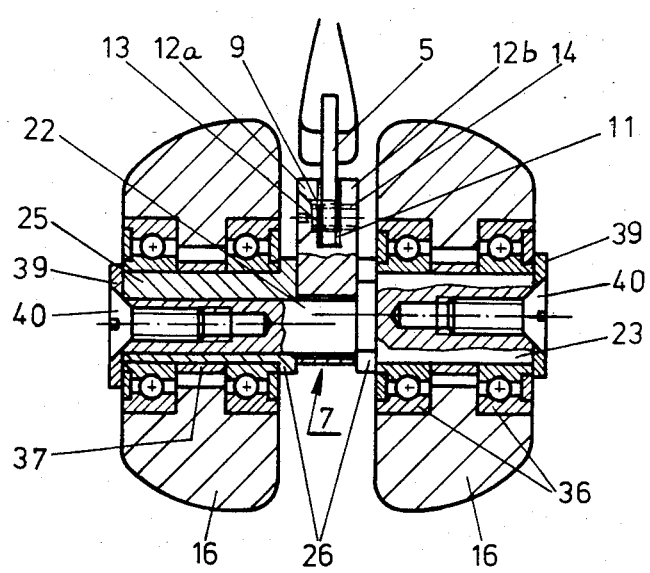
FIG. 2 is a front view, partially in cross-section, of the lower part of the ice skate with the roller-skate undercarriage of FIG. 1 attached.

In order to fasten the roller-skate roller carrier 7 to the blade, the blade is provided with two holes 9. The roller carrier 7, as shown in FIG. 2, has in its upper part a groove 11 between two sides 12a 12b. Carrier 7 is placed over blade 5 so that the blade lies in groove 11. Two holes 13 for a screw in side 12a and two threaded holes 14 in side 12b are aligned with holes 9 of blade 5 and carrier 7 is attached by screws to blade 5. This arrangement makes it possible to fasten different roller carriers having different rollers to the same blade 5.

The embodiment shown in FIG. 1 has thee pairs of rollers 16 which are distributed along carrier 7. The surfaces of rollers 16 as seen in FIGS. 2 and 4, each describe the surface of part of a sphere. Carrier 7, as shown in FIG. 3, is provided with several axle holes 18, some in a front group 19 of holes arranged in a front to rear row, some in a rear group 20 of holes arranged in a front to rear row, and a single axle hole 18 approximately in the center. The position of the front or rear roller pair 16 can thus be changed between the axle holes 18 in front group 19 and rear group 20, respectively. Further groups of axle holes 18, of course, could be used to make it possible to further change the number or position of pairs of rollers 16 on roller carrier 7. In the preferred embodiment, however, the centers of all the axle holes lie in a straight line, as in FIG. 3.

FIG. 4 shows how axle pin 22 and its integrally connected hub 23 is combined to form axle structure 24 which is inserted and fastened into an axle hole 18. The diameter of the axle pin 22 fits inside the diameter of the hole 18. Axle pin 22 is long enough that after its insertion through the roller carrier 7 and with hub 23 pushed all the way to carrier 7, pin 22 protrudes sufficiently on the other side to permit a push-on hub 25 to be pushed over it. Hexagonal bevels 26 on the respective sides of hubs 23 and 25 facing the roller carrier 7 can be held during the attachment of rollers 35. FIG. 4 shows the offset axle pin axis 27 and the hub axis 28, with an eccentricity of "e" with respect to each other. This makes it possible to change the height of the hub axis 28 of each hub and thus of rollers 35 individually with respect to roller carrier 7 by turning either of hubs 23, 25.

Each end of axle structure 24 has a respective threaded hole 30, 31, the mutual eccentricity of holes 30, 31 being also equal to "e". The push-on hub hole 33 of push-on hub 25 is eccentric also by "e" with respect to the central axis of hub 25.

The two hubs 23 and 25 can be turned individually with or on the axle pin 22. This makes it possible to individually change the height of each one of the pairs of rollers 16 with respect to carrier 7. Each individual roller 35 is provided with two closed ball bearings 36 which are separated by a separating sleeve 37. This permits better absorption of jolts upon jumps and the like. A washer 39 and a screw 40 fasten roller 35 to each hub 23, 25.

The drawings do not show front and rear brake rollers, as found in the prior art, but these rollers do not contribute to the present invention.

The two threaded holes 30 and 31 in the same axle structure 24 allow not only the attachment of individual roller 35 to hub 23 but also the firm attachment of both the push-on hub 25 and roller 35 mounted on it by the second screw in threaded hole 30. In addition, the axle structure 24 and hub 25 respectively with the two individual rollers 35 are connected in form-locked manner with respect to axial displacement with the roller carrier 7 and in force-locked manner with respect to rotation. This simple construction permits very simple manufacture, easy adjustment and easy replacement of rollers, whether by other rollers or by replacement of the entire roller carrier 7. It is also possible, depending on the adjustment of the reciprocal height of the pairs of rollers 16, to use the same roller skate either for figure skating or for speed skating.

Although the present invention has been described n connection with a preferred embodiment thereof, many variations and modifications will now become apparent to those skilled in the art. It is preferred, threfore, that the present invention be limited not by the specific disclosure herein, but only by the appended claims.

What is claimed is:

1. A roller skate undercarriage for being attached to a skate which includes an upper structure, the undercarriage comprising:
   a roller carriage including means for supporting skate rollers thereon; and attachment means for detachably fastening the carrier to the upper structure of the skate;
   the means for supporting rollers comprising holes in the carrier each for receiving a roller axle, and roller axles being received in the holes in the carrier; rollers being carried on the roller axles;
   the roller skate undercarriage further comprising a hub supported on the axle outward of the carrier; a respective one of the rollers being received on the hub; the hub having an axis which is parallel to and offset from the axis of the axle, such that rotative adjustment of the hub with respect to the axle adjusts the height of the roller supported on the hub with respect to the carrier;
   a pair of hubs for each axle, the hubs of the pair being located on the opposite sides of the carrier; each hub carrying a respective one of the rollers on it;
   one of the hubs of a pair thereof on an axle being rotatably adjustable with respect to the axle independently of the other hub, whereby each roller of a pair thereof is individually adjustable in height with respect to the carrier.

2. The roller skate undercarriage of claim 1, wherein the hubs are fastened to the carrier against rotation subsequent to rotative adjustment thereof.

3. The roller skate undercarriage of claim 1, wherein the axle includes an axle pin which is non-movably attached to one of the hubs of the pair, and the other hub of the pair is placed on the axle pin and is rotatably adjustable on the axle pin.

4. The roller skate undercarriage of claim 3, wherein one of the rollers is screwed to the axle pin at the side of the rotatably adjustable hub, and the other roller is screwed to the other hub, which is fixed to the axle pin.

5. The roller skate undercarriage of claim 4, wherein the screws fasten the hubs to the carrier against rotation with respect to the axle.

6. The roller skate undercarriage of claim 3, wherein the other hub has an opening therein and the axle pin is received in the opening thereof.

* * * * *